C. B. RICHARDS.
DRILLING MACHINE.
APPLICATION FILED DEC. 3, 1908.
932,060.
Patented Aug. 24, 1909.
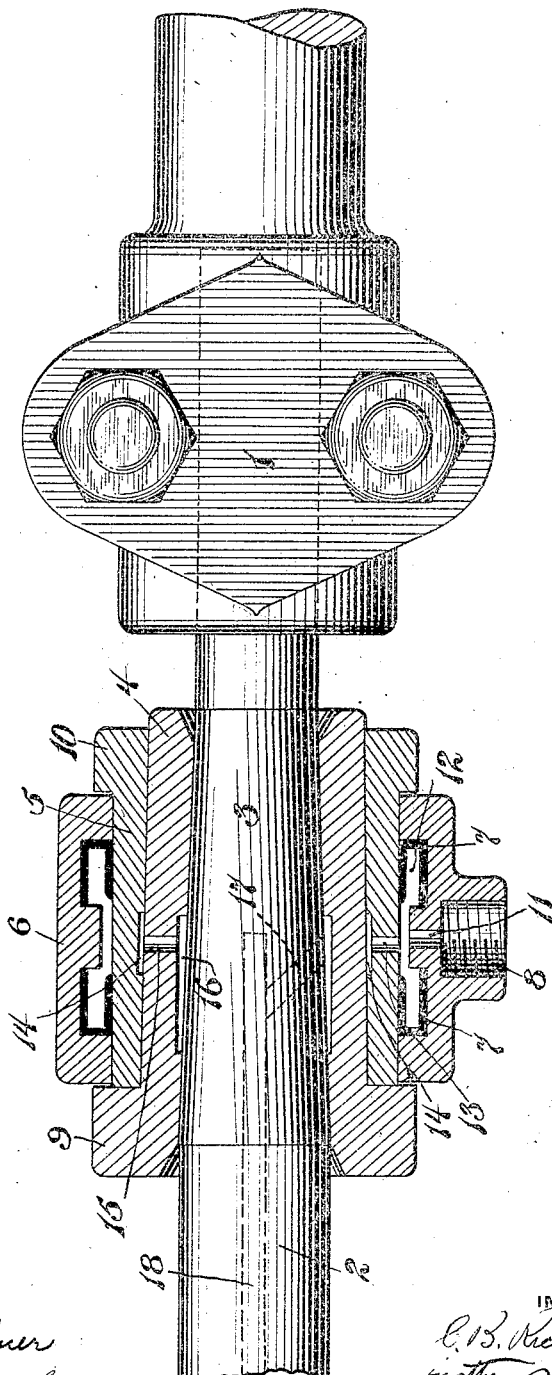
WITNESSES
Harvey L. Lechner
Everling Bellinger
INVENTOR
C. B. Richards

UNITED STATES PATENT OFFICE.

CHARLES B. RICHARDS, OF CLEVELAND, OHIO, ASSIGNOR, BY MESNE ASSIGNMENTS, TO THE CLEVELAND ROCK DRILL COMPANY, OF CLEVELAND, OHIO, A CORPORATION OF OHIO.

DRILLING-MACHINE.

932,060.  Specification of Letters Patent.  Patented Aug. 24, 1909.

Application filed December 3, 1908. Serial No. 465,793.

*To all whom it may concern:*

Be it known that I, CHARLES B. RICHARDS, a citizen of the United States, residing at Cleveland, in the county of Cuyahoga and State of Ohio, have invented certain new and useful Improvements in Drilling-Machines, of which the following is a specification.

The invention has relation to rock drills, and particularly to the means of supplying fluid to rock drills to clean the hole being drilled. The invention has for its primary object: The provision of a simple construction of fluid supplying mechanism, wherein the parts are held in position by the action of the drill, and wherein the provision of all screw or threaded joints, and nuts and bolts is dispensed with. My invention is illustrated in preferred form in the accompanying drawing, which is a longitudinal section of the fluid supplying means as applied to a rock drilling machine of the reciprocating type.

It has been common to provide rock drills with fluid supplying means, but the means usually employed have contained divided parts, such for example, as split water rings, which were either screw threaded together or clamped together by means of nuts and bolts. The constant vibration and jar of the machine makes it difficult to keep a threaded joint tight, and my device is designed to overcome this obstacle.

In carrying out my invention, it will be seen by reference to the drawing, that I provide a chuck 1 of the usual form employed in reciprocating rock drills, in which is mounted in the usual manner a drill steel 2, which has, at a short distance from its chuck end, a tapered section 3, upon which is carried a tapered sleeve 4. This sleeve 4 is also tapered on the outside and carries in turn another tapered sleeve 5, upon which is revolubly mounted a fluid admission ring 6, provided with suitable rubber packing rings or gaskets 7—7 and with an opening 8, screw threaded to receive the end of a hose or other connection from the main source of fluid supply. The sleeves 4 and 5 are respectively provided with collar or shoulder portions 9 and 10, which constitute, when the parts are assembled, a retaining means for the fluid admission ring 6 and prevent any longitudinal movement thereof. The admission ring 6 is free to rotate between these collar portions 9 and 10, and thus prevents the connection to the main fluid supply from twisting, when the chuck and drill are turned during the drilling operation.

By the provision of the tapered section 3 of the drill, the tapered sleeves 4 and 5, and the collars 9 and 10, a means is supplied for holding the various parts of the device in position, independent of any additional holding means; for the impact of the drill steel against the rock being drilled, forces the sleeves 4 and 5 forwardly, causing them respectively to firmly grip the tapered section 3 of the drill, and the sleeve 4. Since, on the rearward movement, the chuck and drill are cushioned in the machine in the usual manner, the impact is not so great as on the forward movement, and the grip of the sleeves 4 and 5 is not loosened and all the parts remain in position. It will be observed that the outside taper of the sleeve 4 is sharper than that of the tapered section 3 of the drill, thus causing the sleeve 5 to hold more tightly than does the sleeve 4 on the drill, and allowing the device as a whole to be knocked from the drill when it is desired to remove or replace the latter.

Referring to the means of supplying water or other suitable fluid to the end of the drill, it will be seen that I provide a port 11 leading from the screw threaded portion 8, above referred to, to a circumferential passage 12 which is formed within the admission ring 6, and from which there is a port 13 leading to a similar passage 14 formed in the sleeve 5. This passage 14 is connected by a port 15 to a passage 16 formed in the sleeve 4, which passage is in turn connected by port 17 transverse the drill to a passageway or hole longitudinal of the drill and extending to the working end thereof. By means of these passages and ports, fluid, when admitted to the opening 8, is carried to the longitudinal hole 18, and thence to the working end of the drill and into the hole being drilled.

It is obvious that by this arrangement there is obtained a simple fluid supplying device, wherein the various parts are readily assembled or separated, and are held in position by the action of the drill, and wherein the provision of any screw threaded portions, or of nuts and bolts, is entirely dispensed with. Other advantages will readily occur to those skilled in the art.

Having thus described my invention and illustrated its use, what I claim as new and desire to secure by Letters Patent is the following:—

1. A fluid supplying means for rock drills comprising in combination, a drill provided with a passage for fluid, a sleeve carried thereby, a second sleeve mounted on the first sleeve and having a tapered fit therewith, an admission ring mounted on the second sleeve and provided with an admission passage, and means on the said sleeves to prevent longitudinal movement of the admission ring, the said sleeves being provided with a passage communicating with the passage in the drill and with the admission passage.

2. A fluid supplying means for rock drills comprising in combination, a drill provided with a passage for fluid and having a tapered section, a tapered sleeve carried thereby, a second sleeve mounted on the first sleeve and having a tapered fit therewith sharper than that of the first sleeve with the tapered section of the drill, an admission ring mounted on the second sleeve and provided with an admission passage, and means on the sleeves to prevent longitudinal movement of the admission ring, the said sleeves being provided with a passage communicating with the passage in the drill and with the admission passage.

3. A fluid supplying means for rock drills comprising in combination, a drill provided with a passage for fluid and having a tapered section the larger end of which is toward the working end of the drill, a sleeve mounted on said tapered section having an outside taper the larger end of which is toward the working end of the drill, a second sleeve fitting the first sleeve and carried thereby, an admission ring mounted on the second sleeve and provided with an admission passage, and means on the said sleeves for preventing longitudinal movement of the admission ring, the said sleeves being provided with a passage communicating with the passage in the drill and with the admission passage.

4. In combination with a rock drill provided with a passage for fluid, of a sleeve secured against forward longitudinal movement of the drill and having its outer surface tapered, increasing in diameter from rear to front, a stop member at the front end of the sleeve, a second sleeve tapered internally to fit the taper of the first sleeve and provided at its rear end with a stop, and an admission ring swiveled on the second sleeve between the stops on the first and second sleeves and provided with an admission passage, the said sleeves being provided with a passage communicating with the passage in the drill and the admission passage.

In testimony whereof I have hereunto signed my name in the presence of the two subscribed witnesses.

CHARLES B. RICHARDS.

Witnesses:
GEO. H. HALL,
F. J. CONNELLY.